United States Patent
Lindsay et al.

(10) Patent No.: US 7,600,149 B2
(45) Date of Patent: Oct. 6, 2009

(54) FAILURE TRANSPARENCY FOR UPDATE APPLICATIONS UNDER SINGLE-MASTER CONFIGURATION

(75) Inventors: Bruce G. Lindsay, San Jose, CA (US); Inderpal S. Narang, Saratoga, CA (US); Vijayshankar Raman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 11/231,204

(22) Filed: Sep. 20, 2005

(65) Prior Publication Data

US 2007/0067664 A1    Mar. 22, 2007

(51) Int. Cl.
*G06F 11/00* (2006.01)
(52) U.S. Cl. .......................................... 714/6; 711/141
(58) Field of Classification Search .................. 714/6; 711/161; 717/168–172; 705/1; 707/201
See application file for complete search history.

(56) References Cited

U.S. PATENT DOCUMENTS

| | | | |
|---|---|---|---|
| 3,838,396 A | 9/1974 | Martin | |
| 5,513,314 A * | 4/1996 | Kandasamy et al. | 714/6 |
| 5,745,896 A | 4/1998 | Vijaykumar | |
| 5,907,689 A | 5/1999 | Tavallaei et al. | |
| 5,995,980 A * | 11/1999 | Olson et al. | 707/201 |
| 6,185,663 B1 | 2/2001 | Burke | |
| 6,668,263 B1 | 12/2003 | Cranston et al. | |
| 6,748,385 B1 | 6/2004 | Rodkin et al. | |
| 6,819,334 B1 | 11/2004 | Owada et al. | |
| 6,862,101 B1 | 3/2005 | Miyazaki et al. | |
| 7,143,307 B1 * | 11/2006 | Witte et al. | 714/6 |
| 7,225,307 B2 * | 5/2007 | Micka et al. | 711/161 |
| 2002/0198734 A1 * | 12/2002 | Greene et al. | 705/1 |
| 2003/0126387 A1 * | 7/2003 | Watanabe | 711/161 |
| 2003/0217119 A1 * | 11/2003 | Raman et al. | 709/219 |
| 2006/0253731 A1 * | 11/2006 | Petruzzo | 714/6 |
| 2007/0061616 A1 * | 3/2007 | Watanabe | 714/6 |

* cited by examiner

*Primary Examiner*—Scott T Baderman
*Assistant Examiner*—Kamini Patel
(74) *Attorney, Agent, or Firm*—Gibb I.P. Law Firm, LLC

(57) ABSTRACT

A method masking data failures, when a master copy of data is unavailable comprises storing a single master copy of data and a replica copy of the data; writing to the master using a middleware component; and reading from either the master or the replica using the middleware component, when the master copy is unavailable. When the master is unavailable, the writes are stored in a table located in the middleware component as stored write requests, in which the stored write requests comprise UDI's to be made to the master. The reads are also performed from the table and the replica when the master is unavailable. When the master becomes available, the stored write requests are propagated to the master. Thus, the middleware allows the writes to run during times when the master is unavailable.

11 Claims, 3 Drawing Sheets

FAILURE TRANSPARENCY FOR UPDATE APPLICATIONS UNDER SINGLE-MASTER CONFIGURATION

BACKGROUND OF THE INVENTION

1. Field of the Invention

Embodiments herein present a method, computer program product, etc. for masking data failures.

2. Description of the Related Art

Today, data management systems pass on failure events during data accesses or updates to application programs. For read-only queries, there is prior work. on making failures by providing partial results to the application programs. But masking failures for applications that do updates is much harder because there is no notion of a partial update. Today, because there is no failure masking, the application programmer has to program for the error condition. For example, an application that is inserting records into a database needs to buffer its updates, periodically poll the data source to see if it has come back up, and then apply its updates once the sources are available. Even this solution is incomplete because subsequent reads from the same application will not see these updates unless the programmer adds special logic.

In file systems, there has been work on disconnected operation, where application programs perform updates against local copies of files. Files are treated as atomic objects and it is assumed that a local copy of the entire file is available. When an application gets disconnected from a master copy, the local copy is a single atomic object that the application updates. The problem listed above—that the application should see both its updates and the existing data while the source is down—is trivial for files because by definition disconnected operation is possible only if there is a local copy, and all the updates and reads are performed on this local copy.

An alternative way of handling failures is through a high-availability cluster HACMP. This ensures that there is always an alternate server that can provide the data if the original server fails. The disadvantage is that it is not transparent to the application. The application must be redirected against the alternative. A very different style of solution to this problem is to assume a peer-to-peer replication environment where there are multiple master copies of the data. In view of the foregoing, it is readily apparent that there is a need for a method, computer program product, etc. for effectively masking data failures.

SUMMARY OF THE INVENTION

Embodiments herein present a method, computer program product, etc. for masking data failures. The method comprises storing a single master copy of data and a read-only copy of the data. Next, the method performs write operations to the master copy using a middleware component. Read operations are then performed from either the master copy or the read-only copy using the middleware component.

When the master copy is unavailable, the write operations are stored in a table located in the middleware component as stored write requests, wherein the stored write requests comprise updates, deletions, and insertions to be made to the master copy. The read operations are also performed from the table and the read-only copy when the master copy is unavailable, wherein the read operations read first data from the read-only copy and modify the first data according to the stored write requests.

When the master copy becomes available, the stored write requests are propagated to the master copy. Thus, by storing the write requests in the table, the middleware allows the write operations to run during times when the master copy is unavailable. The method further comprises identifying a port to send a notification to when the stored write requests cannot be propagated to the master copy due to an integrity constraint.

Accordingly, embodiments of the invention provide failure transparency for update, delete, and insert operations that specify an explicit value for the key column of the data source. When the master copy is down, a delta table is used to store application update, delete, and insert operations. The update, delete, and insert operations are recorded in this delta table in such a way that when the application performs a read, it is known whether the net effect of the update, delete, and insert operations was to insert, update, or delete data. This delta table is kept as part of the middleware infrastructure and is hence highly available.

When the master copy is down, all reads are directed against both this delta table and a replica of the master copy, using an outer-join logic (the delta table has the update, delete, and insert operations performed while the master is down, while the replica has a (stale) copy of the data as of the time when the master went down). When the master copy becomes available, the update, delete, and insert operations in the delta table are propagated back to the data source. Some integrity constraint violations for the update, delete, and insert operations may be missed because the data in replica can be stale; however, such violations are reported to the application during propagation.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
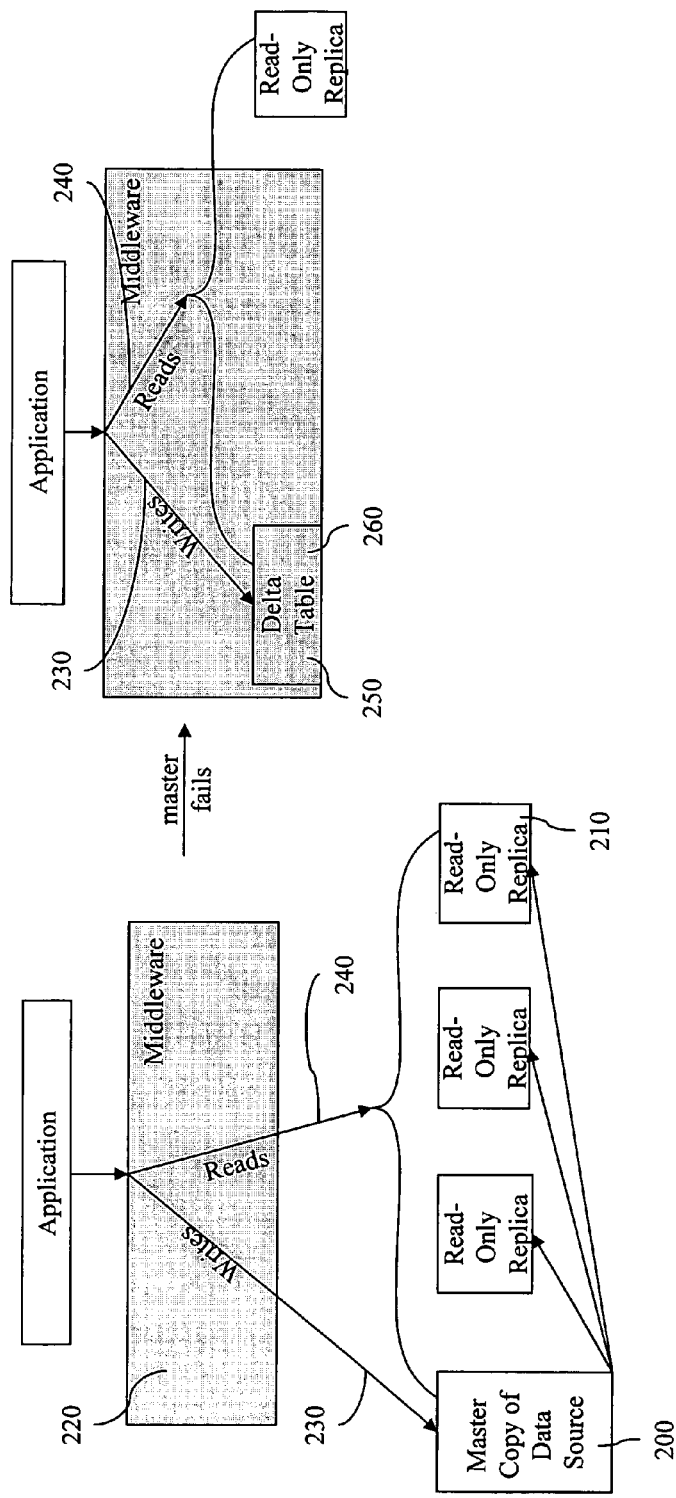
FIG. 1 illustrates a flow diagram of an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

As mentioned above, there is a clear need for a method, computer program product, etc. for effectively masking data failures. The embodiments herein remove burdens from application programmers by allowing middleware to automatically mask data failures. Further, a configuration is provided where there is a single master copy of the data that is being updated, and this master copy has at least one (read only) replica. Thus, embodiments of the invention make the failure of the master copy transparent to the application.

To avoid burdening the application programmer, updates should be applied as usual. In addition, reads should be performed on the updated data as well as existing data—the application program should be able to immediately see what it has updated. This is often needed because an application may perform an update and soon afterwards perform a read, for sanity checking. For example, an application that inserts a bunch of records may make a "count" query at the end to verify that the inserts succeeded. Moreover, the application program should be able to see most of the data that was in the data source at the time the master went down. This is done because performing the update may require checking integrity constraints (e.g., uniqueness), which requires access to the existing data.

Accordingly, embodiments of the invention provide failure transparency for update, delete, and insert operations that specify an explicit value for the key column of the data source. When the master copy is down, a delta table is used to store application update, delete, and insert operations. The update, delete, and insert operations are recorded in this delta table in such a way that when the application performs a read, it is known whether the net effect of the update, delete, and insert operations was to insert, update, or delete data. This delta table is kept as part of the middleware infrastructure and is hence highly available.

When the master copy is down, all reads are directed against both this delta table and a replica of the master copy, using an outer-join logic (the delta table has the update, delete, and insert operations performed while the master is down, while the replica has a (stale) copy of the data as of the time when the master went down). When the master copy becomes available, the update, delete, and insert operations in the delta table are propagated back to the data source. Some integrity constraint violations for the update, delete, and insert operations may be missed because the data in replica can be stale; however, such violations are reported to the application during propagation.

Figure 2:
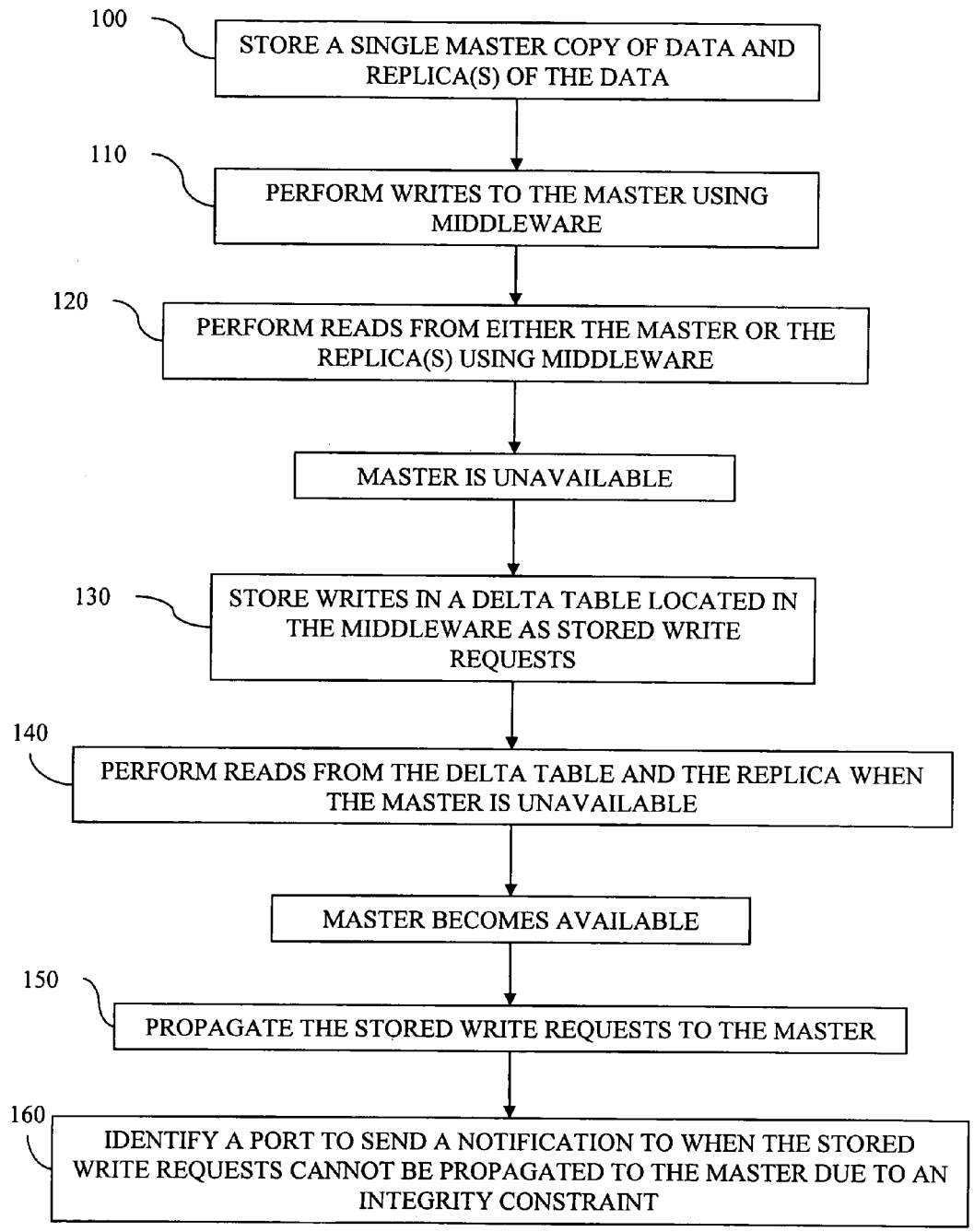
FIG. 2 illustrates a flow diagram of an embodiment of the invention.

Referring now to the drawings, and more particularly to FIGS. 1 through 2, there are shown embodiments of the invention for masking data failures. Embodiments of the invention comprise storing a single master copy 200 of data and one or more read-only copies 210 of the data. Next, write operations 230 are performed to master copy 200 using middleware component 220. Embodiments of the invention perform data accesses through middleware component 220, which will implement the failure transparency. For example, middleware component 220 could be a DBMS. Then, read operations 240 are performed using middleware component 220 from either master copy 200 or read-only copies 210.

When master copy 200 fails, goes down, or is otherwise unavailable, write operations 230 are stored in table 250 as stored write requests 260, wherein table 250 is located in middleware component 220. Stored write requests 260 comprise update, deletion, and insertion operations to be made to master copy 200 (also referred to herein as UDI's). Write operations 230 that don't specify a value for the key column cannot be handled while master copy 200 is down. These write operations 230 are handled by triggering an error.

More specifically, the logic for entering UDI's into C delta (also referred to herein as table 250) is as follows: All updates, deletes and inserts are converted into upserts that match on the key column. A new column "tombstone" can be added to C_delta that takes one of three values "Inserted", "Deleted", or "Updated", depending on whether the cumulative effect of the UDI's on that key value was to insert, delete, or update the tuple.

An extra boolean field NullUpdate_x can also be added to C_delta for each nullable non-key column x. This field represents whether the UDI's have resulted in an explicit NULL value for that field x (as opposed to simply leaving that field unspecified). The default value for this field is false; if there is an update with an explicit NULL value this field is set to true. An alternate implementation would be to compact all these boolean values into a single "null indicator" field, or add this information to the tombstone field itself. The UDI logic is described as follows:

Inserts are converted to Upserts and the C_delta.tombstone is set to, "Inserted". If the state was already "Inserted", an error can be signaled that duplicate key value cannot be inserted. For example, "insert into C(a,b) values (4,5)" is converted to:

```
MERGE INTO C_delta USING TABLE(VALUES(4,5)) S(a,b)
ON S.a=C_delta.a --merging on the key values
WHEN MATCHED AND tombstone<>'Inserted' THEN UPDATE SET
b = S.b and tombstone='Inserted'
WHEN MATCHED AND tombstone='Inserted' THEN SIGNAL
SQLSTATE '70001' SET MESSAGE_TEXT= 'duplicate insert'
WHEN NOT MATCHED THEN INSERT VALUES (S.a,S.b,'Inserted')
```

The replicas (also referred herein to read-only copies 210) are not checked for duplicates. The reasoning is that even if there is a duplicate in the replicas, it might have been deleted at the master (i.e., master copy 200) and the delete may not have propagated to the replicas. So the insert to goes through, with the constraint check performed when the master comes back up. One alternative method is to give a warning to the application that the insert is likely to fail, if there is a duplicate in the replicas. Another alternative is to err on the side of rejecting UDI's when the master is down—in this case, a "very likely this is duplicate insert; try again when the master is available" failure message will be sent if the inserted row has a duplicate in the replicas.

Furthermore, deletes are converted to Upserts and the C_delta.tombstone is set to "Deleted". For example, "delete from C where C.a=4" is converted to:

```
MERGE INTO C_delta USING TABLE(VALUES(4)) S(a)
ON S.a=C_delta.a -- merging on the key values
WHEN MATCHED THEN UPDATE SET tombstone='Deleted'
WHEN NOT MATCHED THEN INSERT VALUES (S.a,null,'Deleted')
```

Additionally, updates that specify a value are converted to Upserts and applied directly on C_delta. For example, "update Cset C.b 5 where C.a -4" is converted to:

```
MERGE INTO C_delta USING TABLE(VALUES(4,5)) S(a,b)
ON S.a=C_delta.a -- merging on the key values
WHEN MATCHED THEN UPDATE SET b = S.b -- note that the
tombstone field is not updated
WHEN NOT MATCHED THEN INSERT VALUES (S.a,S.b,'Updated')
```

If the update specifies a NULL value for a nullable non-key column, the corresponding NullUpdate field can be marked as well. For example, "update Cset C.b =NULL where C.a =4" is converted to:

```
MERGE INTO C_delta USING TABLE(VALUES(4,NULL)) S(a,b)
ON S.a=C_delta.a -- merging on the key values
WHEN MATCHED THEN UPDATE SET b = S.b and NullUpdate_b =
true -- note that the tombstone field is not updated
WHEN NOT MATCHED THEN INSERT VALUES (S.a,S.b,'Updated')
```

Moreover, Recursive Updates are handled by using the replicas to get the prior value for the recursive formula. For example, "update Cset b=b#1 where C.a=4)" is converted to:

```
MERGE INTO C_delta USING (SELECT 4, b+1 from C)AS S -- C
refers to the outerjoin of delta (also referred herein as delta
table or table 250) and replicas
ON S.a=C_delta.a -- merging on the key values
WHEN MATCHED THEN UPDATE SET b = S. b -- note that the
tombstone field is not updated
WHEN NOT MATCHED THEN INSERT VALUES (S.a,S.b,'Updated')
```

The following is a transition table for tombstone field:

| Current Value of C_delta.tombstone | OPERATION | | |
| --- | --- | --- | --- |
| | Insert | Delete | Update |
| Inserted | Error: Duplicate | set tombstone = 'Deleted' | set tombstone = 'Inserted' |
| Deleted | set tombstone = 'Inserted' | set tombstone = 'Deleted' | set tombstone = 'Deleted' |
| Updated | set tombstone = 'Inserted' | set tombstone = 'Deleted' | set tombstone = 'Updated' |

The net effect of these upserts is that all the UDI's on a given key column value are merged together into one record in C_delta. The C_delta.tombstone field of a tuple indicates whether, after a sequence of UDI's, the tuple with that key value was inserted, deleted, or updated. Notice from the transition table above that inserts and deletes change the tombstone field irrespective of its previous value. For example, a series of deletions and updates followed by an insertion is identical to a single insertion. Likewise, a series of updates and inserts followed by a delete is identical to a single delete.

Read operations 240 are also performed against an outerjoin of table 250 and read-only copy 210 when master copy 200 is unavailable. Read operations 240 read first data from read-only copy 210 and modify the first data according to stored write requests 260 in table 250.

More specifically, for answering reads (i.e., read operations 240), the middleware (i.e., middleware component 220) must consider the values in the delta table (the latest writes), as well as the values in the replica (this contains the values that existed before the master went down). This involves an outer join logic as follows (remember that C.a is the key column and C.b is the non-key column): let C_delta be the delta table, and C_original be a replica of the master.

```
C = SELECT COALESCE(C_delta.a,C_original.a), (CASE IF
NullUpdate_b THEN NULL
ELSE
COALESCE(C delta. b, C_original.b) END)
    FROM C_original FULL OUTER JOIN C_delta
    ON C_original.a = C_delta.a
    WHERE
    -- row is present in replica but not in delta (C_delta.a IS
NULL and C_original.a IS NOT NULL)
        OR
    -- row was newly inserted into delta
    (C_delta.a IS NOT NULL and C_original.a IS NULL and
C_delta.tombstone='Inserted')
    OR
    -- row is present in both delta and replica, but the entry in
    the delta is not effectively a delete (C_delta.a IS
    NOT NULL and C_original.a IS NOT NULL and
    C_delta.tombstone<>'Deleted')
```

The read is performed against this outerjoin view. While returning results for the read, the middleware can also return a warning—that the read is being performed against a possibly stale version, so the application can treat these results with more caution if it chooses to.

When master copy 200 becomes available, stored write requests 260 are propagated to master copy 200. Thus, by storing write requests 260 in table 250, middleware 220 allows write operations 230 to run during times when master copy 200 is unavailable. More specifically, when the master becomes available, the UDI's in C_delta are propagated to it using an upsert logic as follows:

```
MERGE INTO C_master CM
USING TABLE(select a,b from C_Delta) CD ON CD.a=CM.a
--mergingonthekeyvalues tuple present on/yin delta
WHEN NOT MATCHED AND CD.tombstone='Inserted'
THEN INSERT VALUES (CD.a,CD.b)
-- tuple deleted in delta WHEN MATCHED AND
CD.tombstone='Deleted'
THEN DELETE
-- tuple present in delta and in master WHEN MATCHED AND
CD.tombstone='Inserted'
THEN SIGNAL SQLSTATE '70001' SET MESSAGE_TEXT=
'duplicate insert' tuple updated in delta.
WHEN MATCHED AND CD.tombstone='Updated'
THEN update set b = (CASE IF NullUpdate_b THEN NULL
ELSE COALESCE(b,CD.b)
END)
```

Propagation includes switching from applying writes to the C_delta to applying writes to C_master atomically. This avoids updates happening simultaneously to C_delta and C_master, which will create conflicting updates. The middleware can achieve this atomic switchover by acquiring an exclusive lock on C_delta before it begins redirecting writes to C_master. In addition, techniques used in online index build are used to avoid quiescing C_master while propagating the changes from C_delta to C_master.

Embodiments of the invention further comprises identifying a port to send a notification to when stored write requests 260 cannot be propagated to master copy 200 due to an integrity constraint. More specifically, during this propagation process integrity constraint violations may be encountered, which were not caught previously because the replica holds only a stale version of the data. For example, a statement "INSERT into C values (4,5)" may go through against the delta table even though there is a duplicate record already existing in the master, simply because this record had not been propagated to the replica when the master crashed. In other words, by the time of propagation the transaction that performed the insert might have committed.

Thus, embodiments of the invention can include optionally embedding an exception-handler in a special errorHandler field of the delta table when the application submits a UDI request. For instance, this value can be the port of a service that can receive the error. The same key value may be updated may times by several UDI statements, so the error handlers are concatenated to the value of the errorHandler field in the delta table. This error handler information may also be obtained from the connection context. If during the UDI propagation, due to some integrity constraint, the UDI cannot be applied, a notification is sent to all the ports in the errorHandler field.

Now referring to FIG. 2, embodiments of the invention comprise a method, wherein item 100 comprises storing a single master copy of data (master copy 200) and one or more replicas of the data (read-only copies 210). Next, in item 110, writes (write operations 230) are performed to the master using middleware (middleware component 220). The method further comprises, in item 120, performing reads (read operations 240) from either the master or the replicas using the middleware.

When the master fails, goes down, or is otherwise unavailable, writes are stored in a delta table (table 250), in item 130, as stored write requests (write requests 260). The delta table is located in the middleware and the stored write requests comprise UDI's to be made to the master. Writes that don't specify a value for the key column cannot be handled while the master down; and as such, these writes are handled by triggering an error. In item 140, reads are also performed against an outerjoin of the delta table and the replica when the master is unavailable. More specifically, reads read first data from the replica and modify the first data according to the stored write requests in the delta table.

When the master becomes available, the stored write requests are propagated from the delta table to the master copy in item 150. Thus, by storing write requests in the delta table, the middleware allows writes to run during times when the master is unavailable. The method further comprises identifying a port to send a notification to when the stored write requests cannot be propagated to the master due to an integrity constraint.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
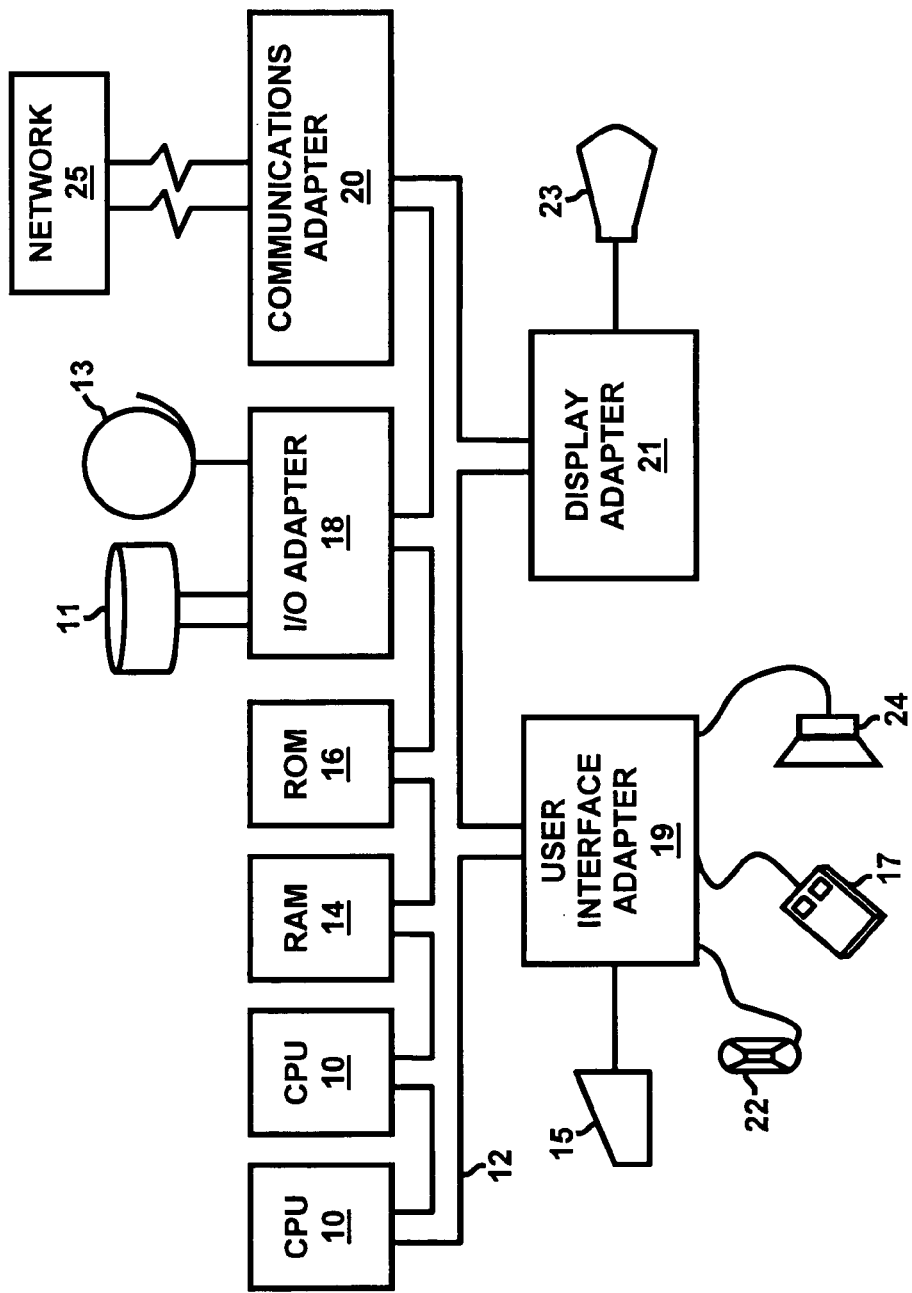
FIG. 3 is a computer system diagram according to an embodiment of the invention.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, embodiments of the invention provide failure transparency for update, delete, and insert operations that specify an explicit value for the key column of the data source. When the master copy is down, a delta table is used to store application update, delete, and insert operations. The update, delete, and insert operations are recorded in this delta table in such a way that when the application performs a read, it is known whether the net effect of the update, delete, and insert operations was to insert, update, or delete data. This delta table is kept as part of the middleware infrastructure and is hence highly available.

When the master copy is down, all reads are directed against both this delta table and a replica of the master copy, using an outer-join logic (the delta table has the update, delete, and insert operations performed while the master is down, while the replica has a (stale) copy of the data as of the time when the master went down). When the master copy becomes available, the update, delete, and insert operations in the delta table are propagated back to the data source. Some integrity constraint violations for the update, delete, and insert operations may be missed because the data in replica can be stale; however, such violations are reported to the application during propagation.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method of for eliminating programming by a programmer to rectify an error condition by masking data failures, when a master copy of data is unavailable, said method comprising:
   storing a single master copy of data and at least one read-only copy of said data;
   performing write operations to said master copy using a middleware component;
   performing read operations from one of said master copy and said read-only copy using said middleware component, when said master copy is available;
   storing said write operations to be made to said master copy, when said master copy is unavailable, in a table located in said middleware component as stored write requests until said master copy becomes available,
      wherein said middleware component implements said stored write requests in said table, when said master copy is unavailable;
   performing said read operations, when said master copy is unavailable, from said table and said read-only copy; and
   propagating said stored write requests to said master copy, when said master copy becomes available, after being unavailable.

2. The method according to claim 1, wherein when said master copy is unavailable, said write operations are stored only in said table as said stored write requests until said master copy becomes available.

3. The method according to claim 1, wherein said read operations first read data from said read-only copy and modify said data according to said stored write requests.

4. The method according to claim 1, wherein said stored write requests comprise any of updates, deletions, and insertions to said master copy.

5. The method according to claim 1, further comprising:
   identifying a port to send a notification to, when said stored write requests cannot be propagated to said master copy due to an integrity constraint; and
   outputting said notification.

6. A method for eliminating programming by a programmer to rectify an error condition by masking data failures, when a master copy of data is unavailable, said method comprising:
   storing a single master copy of data and at least one read-only copy of said data;
   performing write operations to said master copy using a middleware component,
      wherein when said master copy is available, said write operations comprise any of updates, deletions, and insertions to said master copy;
   performing read operations from one of said master copy and said read-only copy using said middleware component, when said master copy is available;
   storing said write operations to be made to said master copy, when said master copy is unavailable, in a table located in said middleware component as stored write requests until said master copy becomes available;
      wherein said middleware component implements said stored write requests in said table, when said master copy is unavailable;
   performing said read operations, when said master copy is unavailable, from said table and said read-only copy;
   propagating said stored write requests to said master copy, when said master copy becomes available, after being unavailable;
   identifying a port to send a notification to, when said stored write requests cannot be propagated to said master copy due to an integrity constraint; and
   outputting said notification.

7. The method according to claim 6, wherein said stored write requests comprise any of updates, deletions, and insertions to said master copy.

8. The method according to claim 6, wherein said read operations first read data from said read-only copy and then modify said data according to said stored write requests.

9. A program storage device readable by machine, tangibly embodying a program of instructions executable by said machine to perform a method for eliminating programming by a programmer to rectify an error condition by masking data failures, when a master copy of data is unavailable, said method comprising:
   storing a single master copy of data and at least one read-only copy of said data;
   performing write operations to said master copy using a middleware component,
      wherein when said master copy is available, said write operations comprise any of updates, deletions, and insertions to said master copy;
   performing read operations from one of said master copy and said read-only copy using said middleware component, when said master copy is available;
   storing said write operations, when said master copy is unavailable, to be made to said master copy in a table located in said middleware component, only as stored write requests until said master copy becomes available;
      wherein said middleware component implements said stored write requests in said table, when said master copy is unavailable;
   performing said read operations, when said master copy is unavailable, from said table and said read-only copy;
   propagating said stored write requests to said master copy, when said master copy becomes available, after being unavailable;
   identifying a port to send a notification to, when said stored write requests cannot be propagated to said master copy due to an integrity constraint; and
   outputting said notification.

10. The program storage device according to claim 9, wherein said read operations first read data from said read-only copy and then modify said data according to said stored write requests.

11. The program storage device according to claim 9, wherein said stored write requests comprise any of updates, deletions, and insertions to said master copy.

* * * * *

UNITED STATES PATENT AND TRADEMARK OFFICE
CERTIFICATE OF CORRECTION

PATENT NO. : 7,600,149 B2 Page 1 of 1
APPLICATION NO. : 11/231204
DATED : October 6, 2009
INVENTOR(S) : Lindsay et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 717 days.

Signed and Sealed this

Fifth Day of October, 2010

David J. Kappos
*Director of the United States Patent and Trademark Office*